(12) United States Patent
Horng

(10) Patent No.: US 7,685,679 B2
(45) Date of Patent: Mar. 30, 2010

(54) PIVOTAL HINGE WITH AN OIL-RETAINING COLLAR

(76) Inventor: Jamie Horng, No. 174, Chunying St., Shulin City, Taipei Hsien (TW)

( * ) Notice: Subject to any disclaimer, the term of this patent is extended or adjusted under 35 U.S.C. 154(b) by 482 days.

(21) Appl. No.: 11/825,043

(22) Filed: Jul. 3, 2007

(65) Prior Publication Data

US 2009/0007377 A1 Jan. 8, 2009

(51) Int. Cl.
*E05D 11/10* (2006.01)
(52) U.S. Cl. ............... 16/330; 16/337; 16/340; 16/250; 16/273
(58) Field of Classification Search .......... 16/337–339, 16/342, 330, 303, 374, 376, 377, 340, 250, 16/251, 273; 361/679.06, 679.12, 679.27; 455/90.3, 575.1, 575.3, 575.8; 379/433.12, 379/433.13; 348/373, 333.01, 333.06, 794
See application file for complete search history.

(56) References Cited

U.S. PATENT DOCUMENTS

| | | | | |
|---|---|---|---|---|
| 6,862,779 | B1 * | 3/2005 | Lu et al. ............... | 16/340 |
| 7,451,523 | B2 * | 11/2008 | Chen .................... | 16/342 |
| 2003/0221288 | A1 * | 12/2003 | Kim et al. ............. | 16/337 |
| 2004/0250381 | A1 * | 12/2004 | Cho et al. ............. | 16/340 |
| 2005/0081334 | A1 * | 4/2005 | Tai ........................ | 16/339 |
| 2005/0155183 | A1 * | 7/2005 | Lu et al. ............... | 16/340 |
| 2005/0166365 | A1 * | 8/2005 | Hsieh ................... | 16/337 |
| 2006/0032022 | A1 * | 2/2006 | Minami ................ | 16/342 |
| 2006/0185126 | A1 * | 8/2006 | Su ........................ | 16/340 |

* cited by examiner

*Primary Examiner*—Chuck Y. Mah

(57) ABSTRACT

A pivotal hinge has multiple washers, positioning spacers and an oil-retaining collar mounted around the washers and the positioning spacers filled with lubricating oil. The oil-retaining collar prevents the lubricating oil from flowing out of the pivotal hinge, prevents the components from wearing away, keeps the pivotal hinge rotating smoothly and has hooks formed separately on the two edges. The hooks hold the collar securely around the pivotal hinge.

4 Claims, 4 Drawing Sheets

PIVOTAL HINGE WITH AN OIL-RETAINING COLLAR

BACKGROUND OF THE INVENTION

1. Field of the Invention

The present invention relates to a hinge, especially to a hinge with an oil-retaining collar mounted around the positioning spacers and washers filled with lubricating oil.

2. Description of the Prior Arts

Electronic devices such as laptops, mobile phones, personal digital assistants (PDA), etc. have a base, a cover and a hinge. The hinge connects the cover to the base to allow the cover to pivot relative to the base.

The conventional hinge has a rotating bracket, a shaft, multiple washers, a stationary bracket, a stationary positioning spacer, a rotating positioning spacer, a biasing member and a nut. The rotating bracket connects to the cover of the electronic device and is mounted on an end of the shaft. The stationary bracket, the washers, the stationary positioning spacer, the rotating positioning spacer and the biasing member are mounted around the shaft. The nut is mounted securely on another end of the shaft to hold the all components. The stationary bracket connects to the base of the electronic device. The stationary positioning spacer has two detents. The rotating positioning spacer has two bosses corresponding to the detents of the stationary positioning spacer to hold the rotating positioning spacer in place.

The washers and the positioning spacers are respectively mounted and abut the rotating and stationary brackets to provide a resistance force so that the cover can be reliably positioned at a desired height. The washers and the positioning spacers further have holes or recesses filled with lubricating oil to prevent those components from wearing away and to keep the pivotal hinge rotating smoothly. However, lubricating oil might flow out of the pivotal hinge between the washers and the positioning spacers causing the pivotal hinge to rotate roughly and wear away if not filled with enough lubricating oil.

To overcome the shortcomings, the present invention provides a pivotal hinge with an oil-retaining collar to mitigate or obviate the aforementioned problems.

SUMMARY OF THE INVENTION

The main objective of the present invention is to provide a pivotal hinge comprising washers, positioning spacers and an oil-retaining collar mounted around the washers and the positioning spacers filled with lubricating oil. The oil-retaining collar prevents the lubricating oil from flowing out of the pivotal hinge, prevents the components from wearing away, keeps the pivotal hinge rotating smoothly and has hooks formed separately on the two edges. The hooks hold the collar securely around the pivotal hinge.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
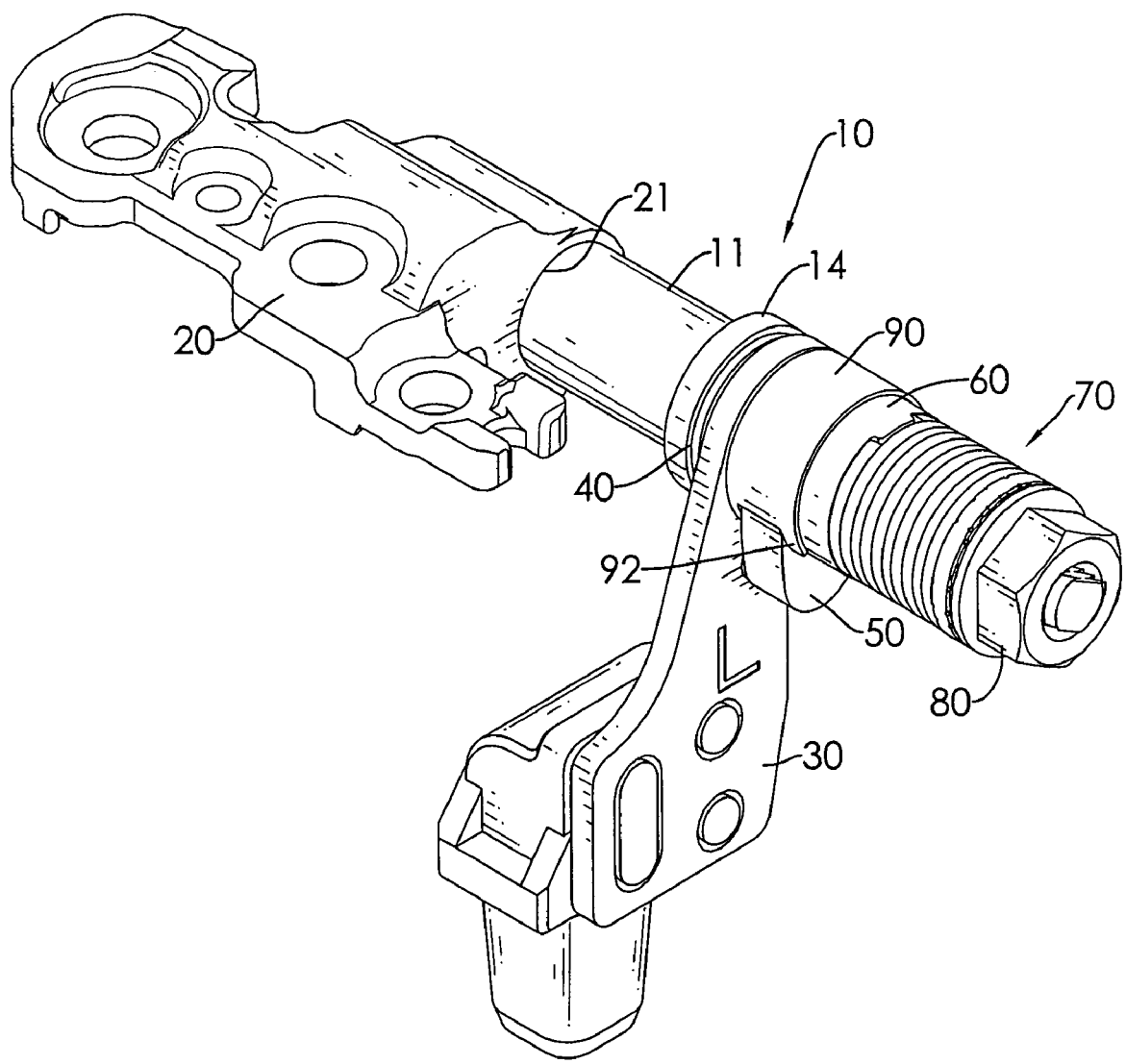
FIG. 1 is a perspective view of a pivotal hinge with an oil-retaining collar in accordance with present invention.
Figure 2:
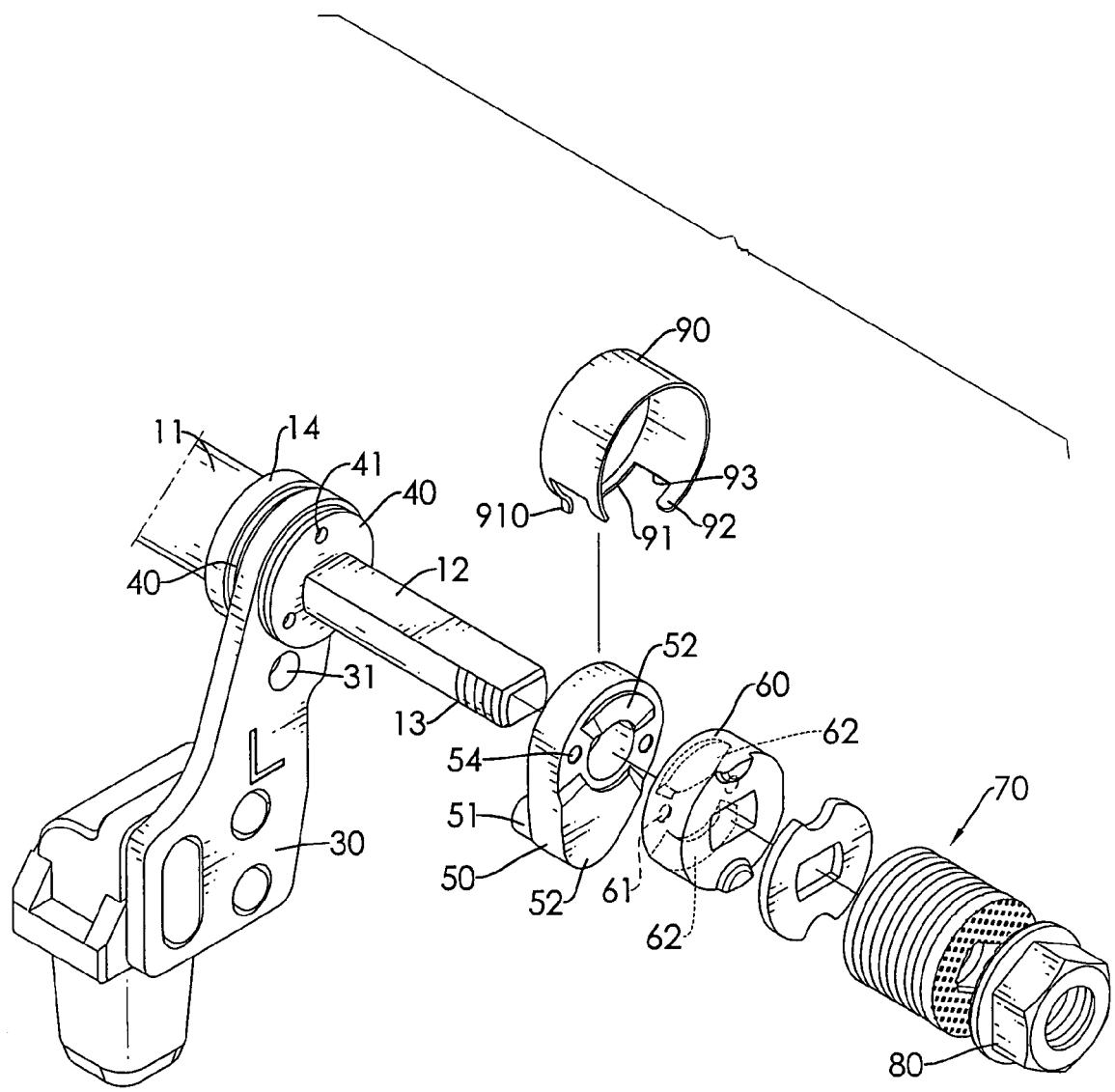
FIG. 2 is a partially exploded view of the pivotal hinge in FIG. 1.

With reference to FIGS. 1 and 2, a pivotal hinge with an oil-retaining collar has a shaft (10), a rotating bracket (20), a stationary bracket (30), multiple washers (40), a stationary positioning spacer (50), a rotating positioning spacer (60), a biasing member (70), a nut (80) and an oil-retaining collar (90).

The shaft (10) has a fastening rod (11), an extension rod (12) and a lip (14). The fastening rod (11) has a distal end and a proximal end. The extension rod (12) is non-circular in cross section, is formed concentrically on the proximal end of the fastening rod (11) and has a distal end and a fastening thread (13). The fastening thread (13) is formed around the distal end of the extension rod (12). The lip (14) is formed radially between the fastening rod (11) and the extension rod (12).

The rotating bracket (20) connects to the cover of the electronic device and is mounted securely on the distal end of the fastening rod (11).

The stationary bracket (30) connects to the base of the electronic device, is mounted around the extension rod (12) and has an outer surfaces and a positioning hole (31).

The washers (40) are mounted around the extension rod (12), between the lip (14) of the shaft (10) and the stationary bracket (30) and abut the outer surface of the stationary bracket (30) and each has a non-circular central hole and multiple oil holes (41). The non-circular central hole is mounted around the non-circular extension rod (12). The oil holes (41) are filled with lubricating oil.

The stationary positioning spacer (50) is mounted around the extension rod (12) adjacent to one washer (40) and has an inner surface, an outer surface, a positioning protrusion (51), two bosses (52) and multiple oil recesses (54). The positioning protrusion (51) is formed on the inner surface of the stationary positioning spacer (50) and is mounted in the positioning hole (31) of the stationary bracket (30). The bosses (52) are formed separately on the outer surface of the stationary positioning spacer (50). The oil recesses (54) are formed separately on the inner and outer surfaces of the stationary positioning spacer (50) and are filled with lubricating oil.

The rotating positioning spacer (60) is mounted around the extension rod (12) adjacent to the stationary positioning spacer (50) and has a non-circular central hole, an inner surface, two detents (62) and multiple oil recesses (61). The non-circular central hole is mounted around the non-circular extension rod (12). The detents (62) are formed separately on the inner surface of the rotating positioning spacer (60) corresponding to the bosses (52) of the stationary positioning spacer (50). The oil recesses (61) are formed separately on the inner surface of the rotating positioning spacer (60) and are filled with lubricating oil.

The biasing member (70) is resilient and mounted around the extension rod (12) adjacent to the rotating positioning spacer (60) and applies a force to the stationary positioning spacer (50) to ensure the stationary positioning spacer (50) firmly abuts the washers (40).

The nut (80) is screwed onto the fastening thread (13) on the extension rod (12).

Figure 3:
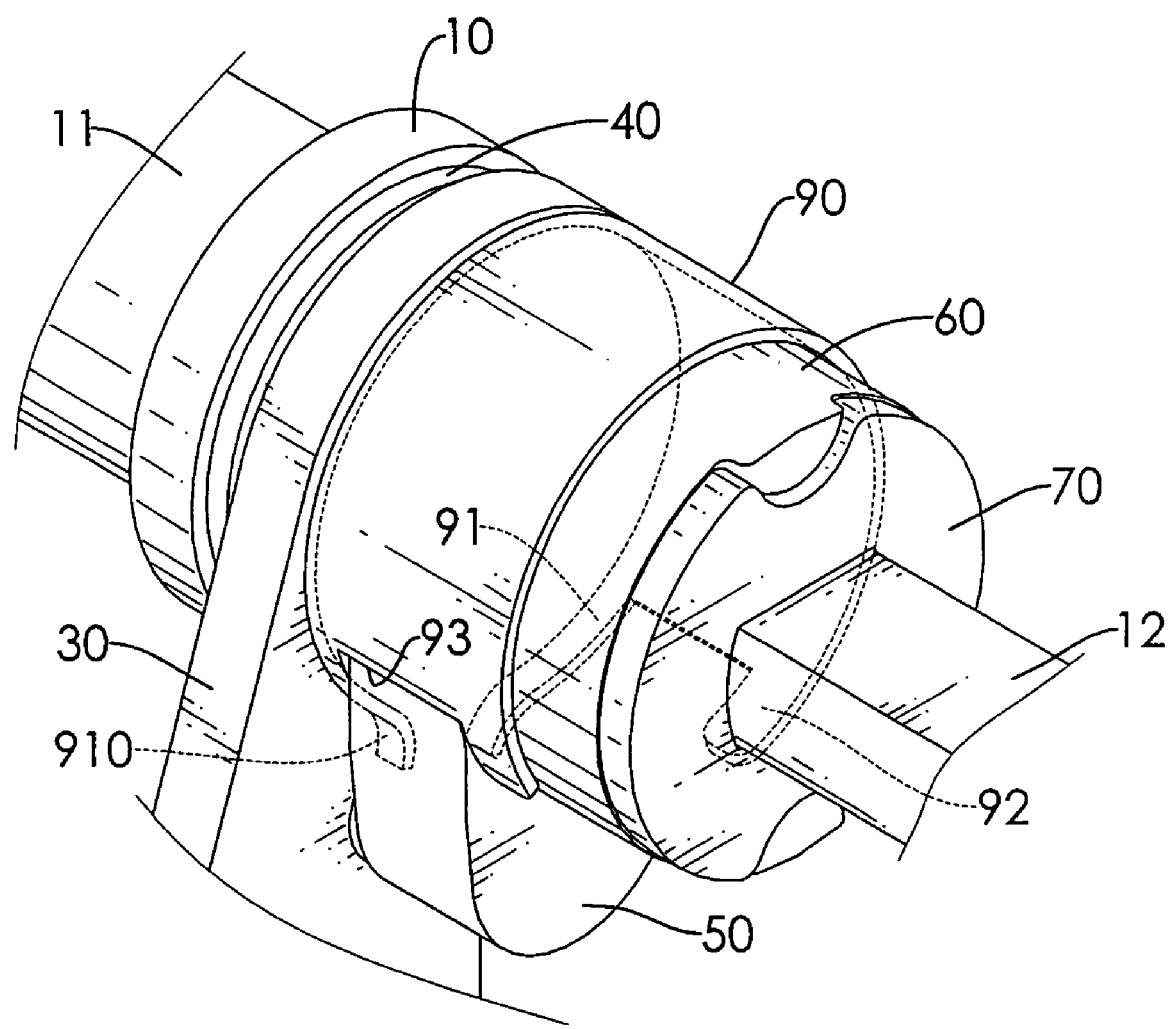
FIG. 3 is a perspective view of the pivotal hinge in FIG. 1 with hidden surface indicated by phantom lines.
Figure 4:
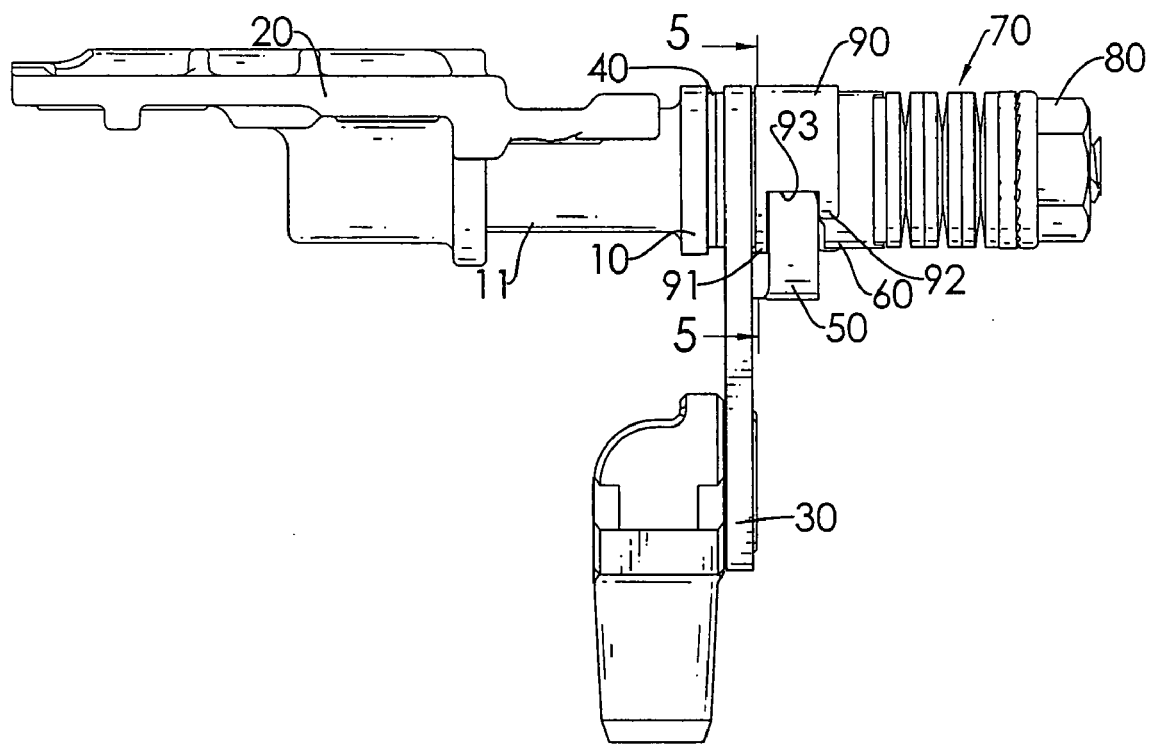
FIG. 4 is a side view of the pivotal hinge in FIG. 1.
Figure 5:
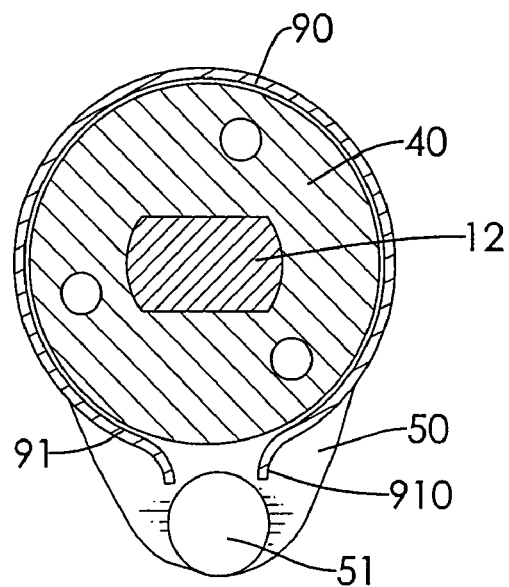
FIG. 5 is a cross-sectional view of the pivotal hinge along line 5-5 in FIG. 4.

With further reference to FIGS. 3 to 5, the oil-retaining collar (90) is mounted around the washers (40) and the positioning spacers (50, 60) and has two edges (93). Each edge (93) has a long hook (91) and may have a short hook (92). The hooks (91, 92) separately protrude from the edge (93) of the oil-retaining collar (90). The long hook (91) is mounted between the stationary bracket (30) and the stationary positioning spacer (50) and around the washers (40) and may have a guiding end (910). The guiding end (910) is slightly bent outward to hold the oil-retaining collar (90) firmly around the washers (40). The short hook (92) is mounted around the rotating positioning spacer (60) and abuts the outer surface of the stationary positioning spacer (50).

The pivotal hinge with an oil-retaining collar as described has the following advantages. The oil-retaining collar (90) is mounted around the washers (40) having oil holes (41) and positioning spacers (50, 60) having oil recesses (54, 61). The hooks (91, 92) further extend the coverage of the oil-retaining collar (90) and hold the oil-retaining collar (90) around the pivotal hinge. Therefore, the oil-retaining collar prevents most of the lubricating oil from flowing out of the pivotal hinge and keeps the pivotal hinge rotating smoothly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pivotal hinge with an oil-retaining collar having
   a shaft having
      a fastening rod having
         a distal end; and
         a proximal end;
      an extension rod being non-circular in cross section, being formed concentrically on the proximal end of the fastening rod and having
         a distal end; and
         a fastening thread being formed around the distal end of the extension rod; and
      a lip being formed radially between the fastening rod and the extension rod;
   a rotating bracket being mounted securely on the distal end of the fastening rod;
   a stationary bracket being mounted around the extension rod and having
      an outer surfaces; and
      a positioning hole;
   multiple washers being mounted around the extension rod and each having
      a non-circular central hole being mounted around the non-circular extension rod; and
      multiple oil holes;
   a stationary positioning spacer being mounted around the extension rod adjacent to one of the washers and having
      an inner surface;
      an outer surface;
      a positioning protrusion being formed on the inner surface of the stationary positioning spacer and being mounted into the positioning hole of the stationary bracket;
      two bosses being formed separately on the outer surface of the stationary positioning spacer; and
      multiple oil recesses being formed separately on the inner and outer surfaces of the stationary positioning spacer;
   a rotating positioning spacer being mounted around the extension rod adjacent to the stationary positioning spacer and having
      a non-circular central hole being mounted around the non-circular extension rod;
      an inner surface;
      two detents being formed separately on the inner surface of the rotating positioning spacer and corresponding to the bosses of the stationary positioning spacer; and
      multiple oil recesses being formed separately on the inner surface of the rotating positioning spacer;
   a biasing member being mounted around the extension rod adjacent to the rotating positioning spacer;
   a nut being screwed onto the fastening thread on the extension rod; and
   an oil-retaining collar being mounted around the washers and the positioning spacers and having two edges each having a long hook protruding from the edge of the oil-retaining collar, each said long hook being mounted between the stationary bracket and the stationary positioning spacer and around the washers.

2. The pivotal hinge as claimed in claim 1, wherein each edge of the oil-retaining collar further has a short hook separately protruding from the edge of the oil-retaining collar, being mounted around the rotating positioning spacer and abutting the outer surface of the stationary positioning spacer.

3. The pivotal hinge as claimed in claim 2, wherein each long hook has a guiding end being slightly bent outward to guide the oil-retaining collar to be mounted around the washers.

4. The pivotal hinge as claimed in claim 3, wherein the washers are mounted between the lip of the shaft and the stationary bracket and abut the outer surface of the stationary bracket.

* * * * *